United States Patent

Kessler et al.

[11] Patent Number: 6,069,680
[45] Date of Patent: May 30, 2000

[54] FLYING SPOT LASER PRINTER APPARATUS AND A METHOD OF PRINTING SUITABLE FOR PRINTING LENTICULAR IMAGES

[75] Inventors: David Kessler, Rochester; Lee W. Tutt, Webster, both of N.Y.

[73] Assignee: Eastman Kodak Company, Rochester, N.Y.

[21] Appl. No.: 09/128,521

[22] Filed: Aug. 3, 1998

[51] Int. Cl.[7] .......................... G03B 35/00; G03B 27/32; G02B 13/08
[52] U.S. Cl. ...................... 355/22; 347/238; 347/243; 347/259; 359/463
[58] Field of Search .............................. 355/22; 347/225, 347/233, 236, 238, 240, 243, 259, 261; 396/327, 328, 330; 359/463

[56] References Cited

U.S. PATENT DOCUMENTS

| | | | |
|---|---|---|---|
| 5,349,419 | 9/1994 | Taguchi et al. | |
| 5,589,870 | 12/1996 | Curry et al. | 347/233 |
| 5,818,645 | 10/1998 | Whaley et al. | 359/668 |
| 5,835,194 | 11/1998 | Morton | 355/22 |
| 5,889,800 | 3/1999 | Kafka et al. | 372/20 |
| 5,923,475 | 7/1999 | Kurtz et al. | 359/619 |
| 5,995,132 | 11/1999 | Tutt | 355/22 |

FOREIGN PATENT DOCUMENTS

| | | |
|---|---|---|
| 0 596 629 | 5/1994 | European Pat. Off. . |
| 0 659 026 | 6/1995 | European Pat. Off. . |
| 42-5473 | 3/1967 | Japan . |
| 48-6488 | 2/1973 | Japan . |
| 49-607 | 1/1974 | Japan . |
| 53-33847 | 9/1978 | Japan . |
| 59-3781 | 1/1984 | Japan . |

*Primary Examiner*—Alan A. Mathews
*Attorney, Agent, or Firm*—Svetlana Z. Short

[57] ABSTRACT

A method and apparatus for printing images. The optical output from a spatial multimode laser, which is multimode in one direction and is single mode in the orthogonal direction, is scanned parallel to the multimode direction. More specifically, according to one aspect of the present invention the printing apparatus includes a multimode laser having an emitting aperture that provides a laser beam. A scanner scans the laser beam from this laser along a scan line such that a long dimension of said emitting aperture corresponds to the scan direction. An optical system focuses the laser beam to a spot having a long dimension and a short dimension, such that the long dimension of the spot is along the scan direction.

12 Claims, 5 Drawing Sheets

FLYING SPOT LASER PRINTER APPARATUS AND A METHOD OF PRINTING SUITABLE FOR PRINTING LENTICULAR IMAGES

CROSS-REFERENCE TO RELATED APPLICATIONS

Cross-reference is made to commonly assigned copending U.S. application Ser. No. 09/128,077, filed concurrently herewith and entitled "PRINTING LENTICULAR IMAGES", by David Kessler et al.

U.S. Ser. No. 08/961,057, filed Oct. 30, 1997, entitled "A Method for Printing Interdigitated Images", by Lee W. Tutt, now U.S Pat. No. 5,835,194, and U.S. Ser. No. 08/828,637, filed Mar. 31, 1997, entitled "Apparatus and Method for Aligning and Printing Multiple Images", by Roger R. A. Morton, now U.S. Pat. No. 5,995,132, are incorporated herein by reference.

FIELD OF THE INVENTION

The present invention relates in general to flying spot laser printers and is especially suitable for printing lenticular images using multimode lasers.

BACKGROUND OF THE INVENTION

Lenticular sheets are used to give images an appearance of depth. More specifically, a lenticular sheet comprises a transparent upper layer A having narrow, parallel lenticulas (semi-cylindrical lenses) B on an outer surface, and an image-containing substrate layer C which projects images through the lenticulas. (See FIG. 1). The two layers of a lenticular sheet provide an image such that different portions of the image are selectively visible as a function of the angle from which the lenticular sheet is viewed. If the image is a composite picture made by bringing together into a single composition a number of different parts of a scene photographed from different angles, and the lenticulas are vertically oriented, each eye of a viewer will see different elements and the viewer will interpret the net result as a three dimensional (3-D) image. The viewer may also move his head with respect to the lenticular sheet thereby observing other views with each eye and enhancing the sense of depth.

Another method for showing 3-D images is the use of a blocking line screen positioned at a specific distance from the composite picture. This process, known as a parallax process, causes blocking of all images except one specific image. This allows the eyes to view different images as three-dimensional (3-D) images, when the blocking line screen is oriented vertically.

When the lenticulas or the blocking line screen is oriented horizontally, each eye receives the same image. In this case, the multiple images give illusion of motion when the composite image is rotated about a line parallel to the viewer's eyes. Thus, a simulation of motion is achieved by the process of tipping the lenticular sheet or the blocking line screen, or by movement of the viewer's head to a different angle with respect to the lenticular sheet.

Whether the lenticulas or the blocking line screen is oriented vertically or horizontally, each of the viewed images is generated by lines of images (also referred to as image lines) which have been interlaced at the spatial frequency of the lenticulas or the blocking line screen. Interlacing lines of each image with other images is referred to as interdigitation. A full set of such interdigitated image lines forms a lenticular image. Interdigitation can be better understood by using an example of four images used to form a composite image with a material having three lenticulas. In this example, line 1 from each of the four images is in registration with the first lenticula; line 2 from each of the four images is in registration with the second lenticula; etc. Each lenticula is associated with a plurality of image lines D or an image line set (See FIG. 1), and the viewer sees only one image line of each set with each eye for each lenticula. It is imperative that the image line sets be registered accurately with respect to the lenticulas, so that the proper picture is formed when the assembly is viewed. One method of conventional recording of the interdigitated image lines requires recording of the interdigitated image lines on a recording material contained on the substrate layer C and then attaching the substrate layer C to the upper layer A, with the recorded image lines D in precise alignment to the lenticulas B to yield the desired image structure. The precise alignment of the specific lenticulas with the desired image line set during the attachment of the recording material to the lenticular overlay is difficult to achieve. This results in a degraded image quality.

Conventional recording of lenticular images has been accomplished with a stereoscopic image recording apparatus that uses optical exposure. A light source, such as a halogen lamp, is projected through an original image, via a projection lens, and focused on the substrate layer of the lenticular sheet. The lenticular images are exposed on a recording material as interdigitated image lines. Japanese (Kokoku) Patent Applications Nos. 5473/1967, 6488/1973, 607/1974, and 33847/1978 disclose recording apparatus in which two original images are projected for printing on a lenticular recording material. Recording lenticular images in this fashion (i) requires complex projection lens systems, which are expensive, and (ii) does not work well with thermal dye transfer approaches because it requires more power than what is produced by a halogen lamp or a similar light source.

In contrast, image recording by scanning (linear) exposure requires comparatively simple optics, yet has great flexibility in adapting to various image processing operations, and to alterations in the dimension of the lenticulas. To take advantage of these features, various apparatus and methods have been proposed for recording an image by scanning exposure. For example, Japanese (Kokoku) Patent Application No. 3781/1984 teaches a stereoscopic image recording system in which a plurality of original images is taken with a TV camera, processed and stored in frame memories from which the stored image signals are retrieved sequentially as image lines in accordance with the pitch of lenticulas used. After the image lines are recorded on a substrate layer by scanning exposure, the upper layer of the lenticular sheet is bonded to the substrate layer containing the image lines. Another image recording system uses polygon scanners, described in U.S. Pat. No. 5,349,419, for exposure of stereoscopic images directly on photosensitive back surface of a lenticular sheet.

It is desirable to write interdigitated images directly on a back surface of lenticular sheet using thermal dye transfer. This would eliminate the need for careful alignment of specific pre-printed image lines of the substrate layer with the specific lenticulas of the upper layer of the lenticular sheet. The use of thermal dye transfer to write such interdigitated images requires, however, large amounts of energy. Such energy can be provided by high power lasers.

Furthermore, high quality lenticular images require that a large number of images be placed behind a fine pitched lenticular sheet. For example, in order to produce 25 images with a lenticular sheet of 100 lenticulas per inch one needs to produce 2500 lines per inch of continuous tone spots. This means a pixel size of approximately 10 microns or less. To expose such a small pixel, the beam size has to be approximately of the same size as the pixel size. A single mode laser can easily provide such a small beam size. Therefore, a single mode laser, may be used to write interdigitated images. Unfortunately, high power, inexpensive single mode diode lasers are not available.

SUMMARY OF THE INVENTION

It is an object of the present invention to provide a method that utilizes inexpensive, high power, multimode lasers to print lenticular images.

The present invention is directed to overcoming one or more of the problems set forth above. Briefly summarized, a method for printing images comprises the steps of: (i) providing at least one multimode laser beam with an emitting aperture of at least one multimode laser; (ii) forming a scanning spot having a long dimension and a short dimension with the multimode laser beam, such that the long dimension of the scanning spot corresponds to a long dimension of the emitting aperture; and (iii) scanning the multimode laser beam across a recording material such that the long dimension of the scanning spot is parallel to scan direction.

According to another aspect of the present invention an apparatus comprises: (i) a laser having an emitting aperture, wherein the laser is multimode in a first direction and single mode in a second direction perpendicular to the first direction; (ii) a scanner oriented to scan a laser beam from the laser along a scan line such that a long dimension of said emitting aperture corresponds a fast scan direction of the scanner; and (iii) an optical system focusing the laser beam to a spot having a long dimension and a short dimension, such that the long dimension of the spot is along the fast scan direction.

According to one embodiment of the present invention, a method for printing lenticular images comprises the steps of: (i) procuring a lenticular sheet having a plurality of lenticulas of a predetermined length and shape on its front side; (ii) providing at least one laser beam with an emitting aperture of at least one multimode laser; (iii) orienting the lenticular sheet so that the laser beam, when scanned, scans parallel to the length of the lenticulas; (iv) forming with the laser beam a scanning spot having a long and a short dimension, such that the long dimension of the scanning spot corresponds to the long dimension of the emitting aperture and is parallel to the length of the lenticulas; and (v) translating the lenticular sheet in a direction perpendicular to the scan line.

The above, and other objects, advantages and novel features of the present invention will become more apparent from the accompanying detailed description thereof when considered in conjunction with the following drawings.

BRIEF DESCRIPTION OF THE DRAWINGS

FIG. 3A corresponds to a short dimension of the emitting aperture. FIG. 3B corresponds to a long dimension of the emitting aperture.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
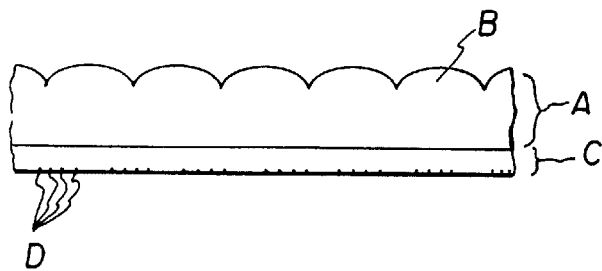
FIG. 1 illustrates a prior art lenticular sheet.
Figure 2:
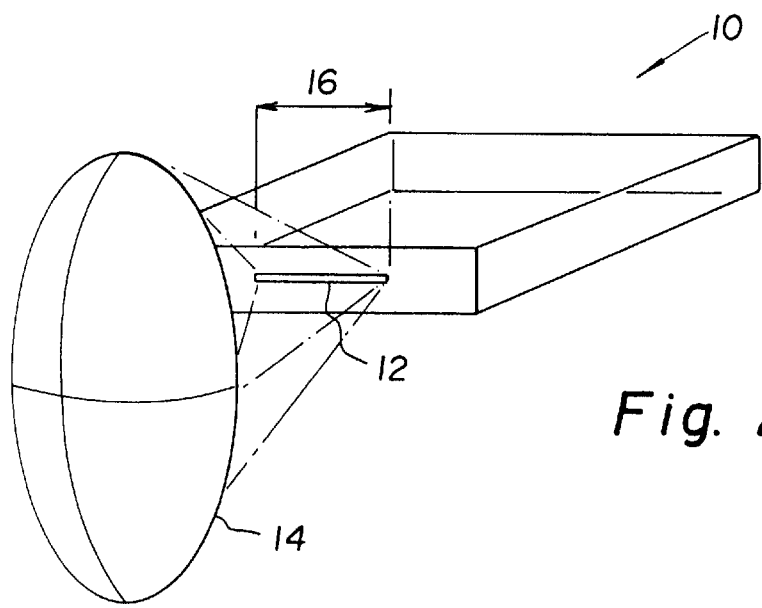
FIG. 2 is a schematic view of the emitting aperture and the emitted light of a typical multimode laser.
Figure 3A:
FIGS. 3A and 3B illustrate a laser beam cone emitted from the emitting aperture of a diode laser.
Figure 3B:
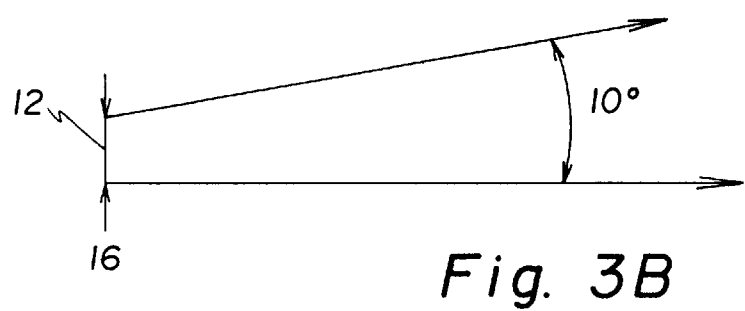
Figure 4:
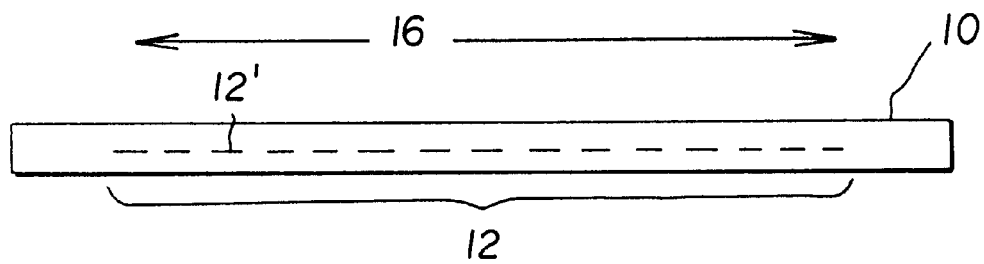
FIG. 4 illustrates schematically a laser with an emitting aperture comprising an array of small apertures.

With reference to FIG. 2, the emitting aperture 12 of a typical multimode 1 Watt edge emitting diode laser 10 is $100\mu$ by $1\mu$. This narrow emitting aperture is a direct result of the manufacturing process. Higher power lasers have longer emitting apertures. For example, a 2 Watt laser will typically have an emitting aperture with dimensions of $200\mu$ by $1\mu$. The laser light (from the 1 Watt laser) is emitted from the $100\mu$ by $1\mu$ emitting aperture into a cone 14 of typically 10° full width half maximum (FWHM) by 40° FWHM. FIGS. 3A and 3B schematically show a greatly enlarged aperture 12 and illustrate that a larger cone angle corresponds to a small aperture dimension and a smaller cone angle corresponds to a large aperture dimension. The long dimension 16 of the emitting aperture 12 can be formed as an array of small apertures 12' (See FIG. 4) within the $100\mu$ by $1\mu$ or as one contiguous aperture as shown in FIG. 2.

The Lagrange value H of a laser beam is commonly defined as the product of half the beam size and half the divergence angle. The beam size is defined as half the emitting aperture diameter for a multimode laser and as FWHM beam waist radius for a single mode laser.

A typical single (spatial) mode laser has a Lagrange value of $H=0.35*\lambda/\pi$, where $\pi$ is the wavelength of the laser beam. Therefore, for a wavelength of $0.83\mu$ the Lagrange value of a single mode laser is given by $H=0.35*0.83/\pi=0.09\mu$. A typical multimode 1 watt laser behaves like, and for practical purposes is, a single mode laser in the direction perpendicular to the long dimension of the emitting aperture. Thus the Lagrange value of the multimode laser in this direction is about 0.09.

In the long dimension of the emitting aperture (i.e., in the direction perpendicular to the short direction) the Lagrange value of the 1 watt multimode laser (with a $100\mu$ long emitting aperture) is given by $H=(50\mu)*(0.14)=7\mu$. This value is much larger then the Lagrange value for the single mode laser and thus we refer to the emission in this direction as multimode emission. It is well known that the number of resolvable spots of a flying spot laser printer along the scan line is inversely proportional to the Lagrange value of the laser beam. This is why flying spot laser printers, invariably use single mode lasers which have the smaller Lagrange value. However, as mentioned above, high power single mode lasers are expensive.

Figure 5:
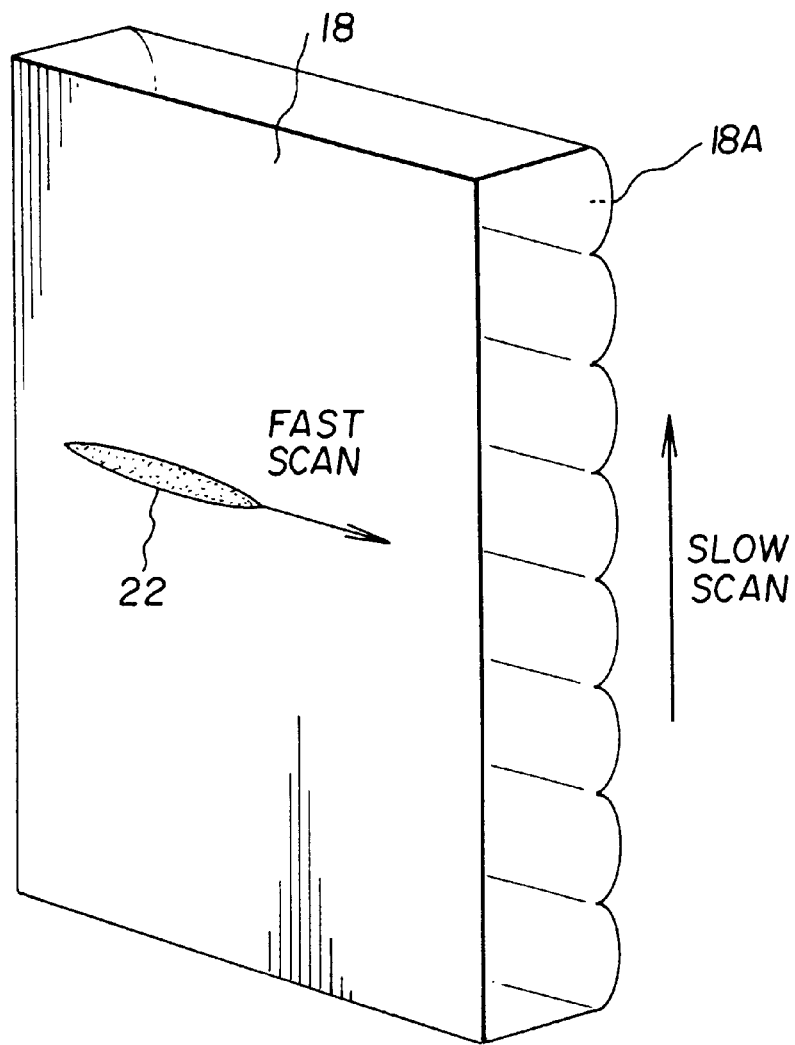
FIG. 5 shows the orientation of a scanning spot of a multimode diode laser during exposure of a lenticular sheet in the fast scan direction.
Figure 6:
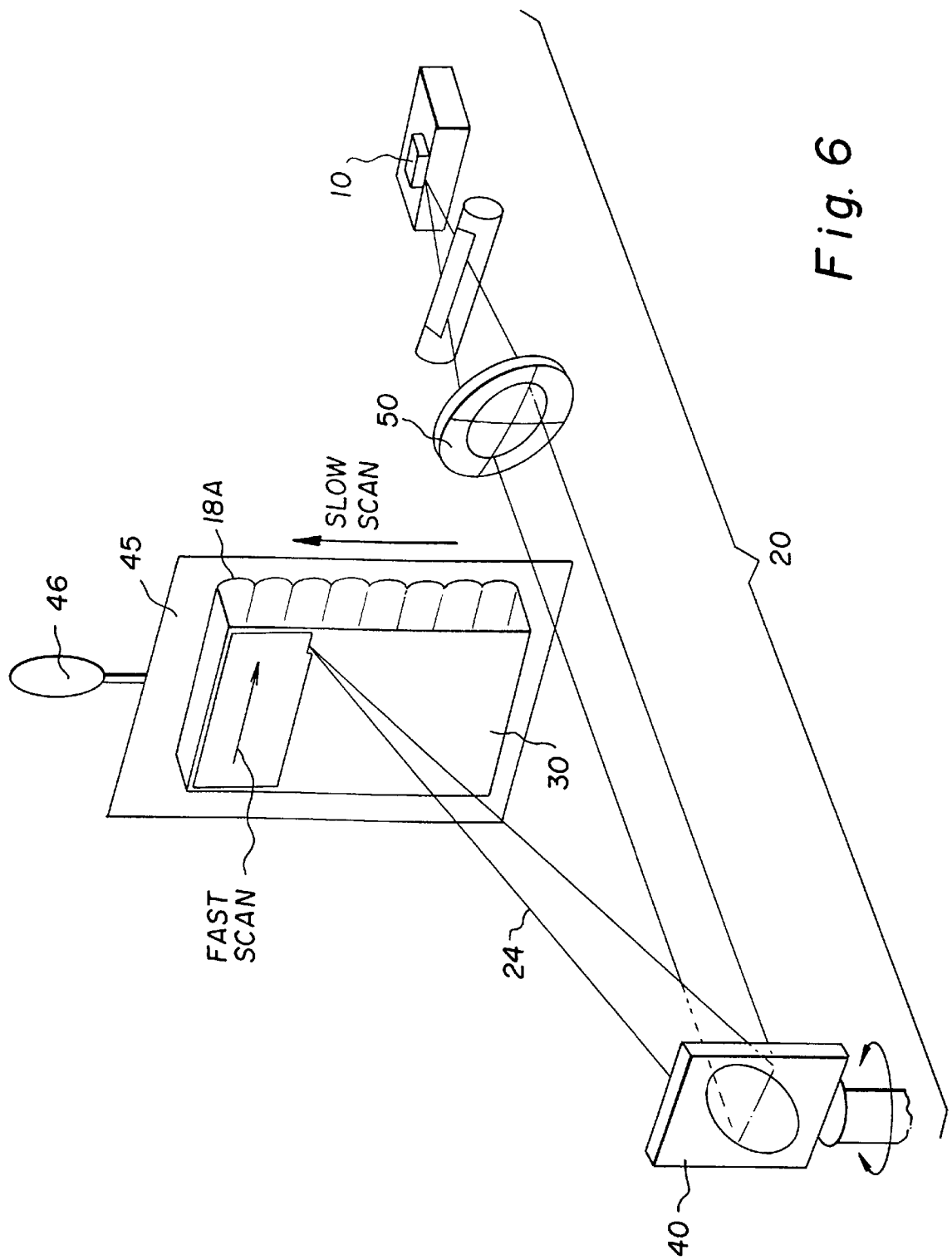
FIG. 6 is a perspective schematic view of a printer showing a stage for translating a lenticular sheet (and a thermal donor if a thermal dye transfer method is used) in a cross-scan direction.
Figure 7:
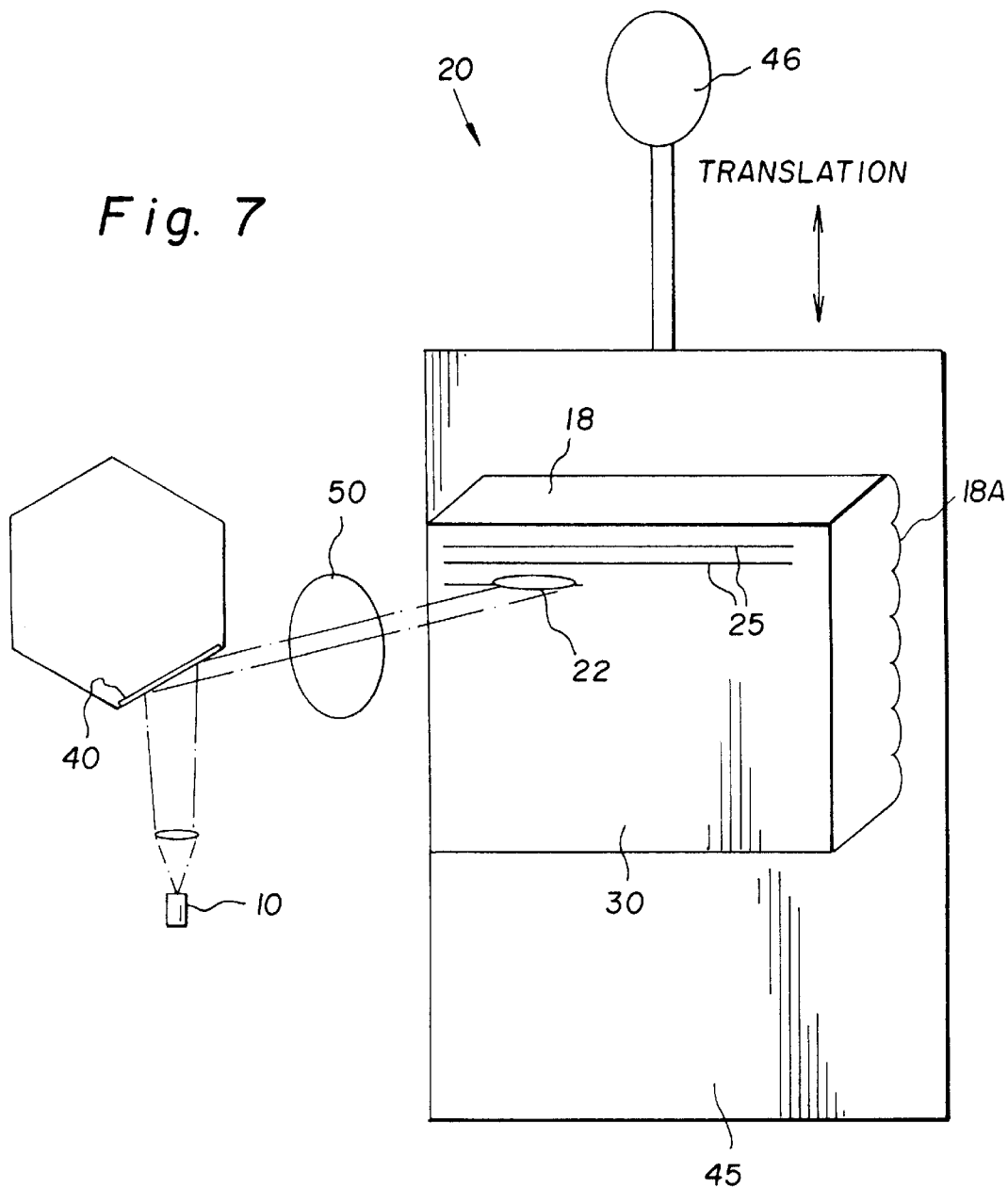
FIG. 7 is a perspective schematic view of a printer utilizing a polygon mirror.

With reference to FIGS. 5–7, the printing of the image lines (forming a lenticular image) on the back surface of a lenticular sheet 18 is done using a flying spot scanner 20 in such manner that the fast scanning direction corresponds to the direction of the long dimension 16 of the emitting aperture 12 of the multimode laser 10. That is, the scanning spot 22 formed by the laser beam 24 is longer in the fast scan direction. Because of the large Lagrange value of the laser beam 24 in this direction (i.e., the fast-scanning direction) the number of resolvable spots in this direction is considerably smaller than would have been possible with a single mode laser. However, for this application a total number of resolvable spots of about 1000 per (3.5 inch) scan line is acceptable. This corresponds to about 286 DPI. The resolution in the cross scan direction is determined by the number of lenticulas per inch times the number of images, thus requiring higher resolution in this direction. As mentioned before, the size of the scanning spot 22 in the cross scan direction has to be about $10\mu$.

Each of the images presented by a lenticular sheet 18 is a relatively low resolution image. However, because of the multiple image lines 25 (one from each image) corresponding to each lenticula 18A, the interlaced image lines 25 have to be very thin and spaced very closely to one another. Thus, the printer recording these image lines 25 must be able to provide high resolution pattern in the cross-scan direction. Therefore, because of the unusual requirements of the lenticular images, namely, the need for a small spot size only in the cross scan direction, we are able to write with a scanning laser beam 24 providing a spot 22 that is large in the scan direction. Thus, we utilize a multimode diode laser 10 instead of a more expensive single mode laser. The multimode diode laser 10 is used in a manner not possible in printers for production of ordinary images requiring symmetric resolution.

As shown in FIG. 5, the long dimension of the scanning spot 22 provided by the scanning multimode laser beam 24 is along the fast scan (also referred to as a line scan) direction and is preferably perpendicular to the cross-scan direction. The long dimension of the scanning spot corresponds to the long dimension 16 of the emitting aperture 12 and to a beam cross section with a large Lagrange value. The short dimension of the scanning spot corresponds to the short dimension of the emitting aperture 12 and to a beam cross section with a small Lagrange value. Because of the small size of the scanning spot in the cross scan direction a very narrow line 25 with width of about $10\mu$ is produced by the scanning spot on the recording material 30. The recording material 30 may be, for example, a back surface of a lenticular sheet and a thermally activated donor. Although thermal dye transfer method is preferred, actinically exposed material, such as silver halide, can also be used as a recording material 30 if visible light lasers are utilized. If an actinically exposed material is being used, a thermal donor is not needed.

While the laser beam 24 is being scanned, the laser 10 is being current modulated according to the image data to properly modulate the intensity of the laser beam.

The recording material 30 is advanced, as shown by a vertical arrow on FIG. 5, in the slow scan (cross scan) direction so that when the next scan line is started, one narrow line spacing has been made thereby abutting the image lines. The scanning function may be accomplished by any scanner, for example a galvo-mirror 40 (FIG. 6), spinning hologon, or a spinning polygon mirror 40' shown in FIG. 7. The laser beam 24 is focused on the recording material 30 with an optical system 50, for example, an f–θ lens shown in FIG. 6. Such an optical system may be made of refractive and/or reflective component(s).

Figure 8:
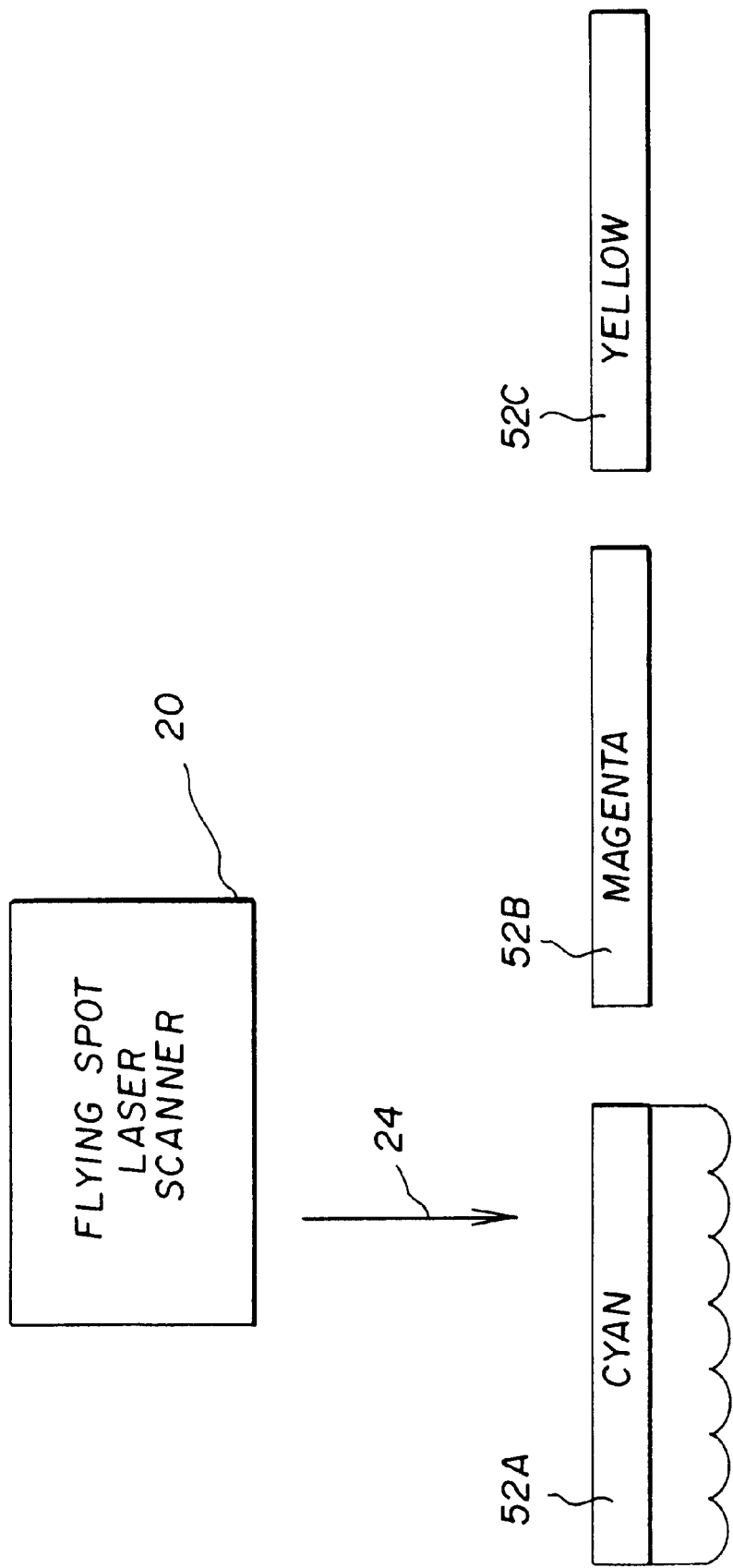
FIG. 8 is a schematic view of an embodiment that utilizes a multimode diode laser to consequently expose three thermal donors in order to write image lines on the lenticular sheet.

In order to use a scanning multimode laser beam in conjunction with a thermal dye transfer method, the laser beam is scanned across a thermal donor adhered to the back surface of a lenticular sheet and the scan is conducted in registration with the lenticulas. The stage 45 supporting the recording material is translated by a driver 46 relative to the scanning laser beam 24. If the recording material 30 includes a thermal donor 52A, 52B, 52C, the first thermal donor 52A is removed and the process repeated with two new thermal donors 52B and 52C (of different colors) to achieve a full color image. This is shown in FIG. 8.

The disclosed apparatus and method can be used for printing line images used with a line blocking screen in a parallax process. The invention has been described in detail with particular reference to certain preferred embodiments thereof, but it will be understood that variations and modifications can be effected within the spirit and scope of the invention.

PARTS LIST

10 Diode laser
12 Aperture
14 Cone
16 Long dimension
20 Flying spot laser scanner
25 Line
30 Recording material
40 Galvo-mirror
45 Stage
46 Stage driver
50 Optical system
52 A,B, C Dye donors

What is claimed is:

1. An apparatus for generating lenticular images on a lenticular sheet having a plurality of lenticulas, said apparatus comprising:

a laser having an emitting aperture, wherein said laser is multimode in a first direction and single mode in a second direction perpendicular to said first direction;

a scanner oriented to scan a laser beam from said laser along a scan line such that a long dimension of said emitting aperture corresponds a fast scanning direction of said scanner; and an optical system focusing said laser beam to a spot.

2. An apparatus according to claim 1 further comprising a driver for moving a lenticular sheet relative to said scan line.

3. An apparatus according to claim 2 wherein the lenticular sheet contains silver halide recording material and said laser is a visible light laser.

4. An apparatus according to claim 2 wherein said scanner is a galvo-mirror.

5. An apparatus according to claim 2 wherein said scanner is a polygon scanner.

6. An apparatus according to claim 2 wherein said laser is a diode laser.

7. An apparatus according to claim 2 wherein said laser is a edge emitting diode laser.

8. An apparatus comprising:
a laser having an emitting aperture, wherein said laser is multimode in a first direction and single mode in a second direction perpendicular to said first direction;
a scanner oriented to scan a laser beam from said laser along a scan line such that a long dimension of said emitting aperture corresponds a fast scan direction of said scanner; and
an optical system focusing said laser beam to a spot having a long dimension and a short dimension, such that the long dimension of said spot is along the fast scan direction.

9. An apparatus according to claim 8 further comprising a driver for moving a recording material perpendicular to said scan line.

10. An apparatus according to claim 9 wherein said scanner is a galvo-mirror.

11. An apparatus according to claim 10 wherein said scanner is a polygon scanner.

12. An apparatus according to claim 8 wherein said laser is a diode laser.

* * * * *